Nov. 15, 1955 C. H. JONES 2,724,013

COLOR TELEVISION RECEIVER

Filed May 17, 1952 2 Sheets-Sheet 1

WITNESSES:
E. A. McCluskey
Leon M. Garman

INVENTOR
Charles H. Jones.
BY
F. E. Browder
ATTORNEY

Nov. 15, 1955 C. H. JONES 2,724,013

COLOR TELEVISION RECEIVER

Filed May 17, 1952 2 Sheets-Sheet 2

WITNESSES:

E. A. McCloskey.

Leon M. Garman

INVENTOR

Charles H. Jones.

BY

F. E. Browder

ATTORNEY

United States Patent Office 2,724,013
Patented Nov. 15, 1955

2,724,013

COLOR TELEVISION RECEIVER

Charles H. Jones, Pittsburgh, Pa., assignor to Westinghouse Electric Corporation, East Pittsburgh, Pa., a corporation of Pennsylvania Application May 17, 1952, Serial No. 288,421

14 Claims. (Cl. 178—5.4)

My invention relates to color television and in particular relates to arrangements for receiving color television broadcasts of the frame sequential type in which successive pictures of the blue, green and red light in the view being broadcast are sent out from the transmitter. The observer at the receiver is expected to see these successive pictures, referred to as "frames" respectively through a blue-transmission filter, a green-transmission filter and a red-transmission filter in rapid succession which produces on his mind an impression of seeing the transmitted view in its true colors. According to current practice, the receiver-filters are mounted on a rapidly rotating wheel or drum; but for 16 to 20-inch picture-screens such as the art now employs, the machinery for producing this rotation is of formidable bulk and power.

One object of my invention is to provide an arrangement in which successive frames on screen of a picture-receiving tube, such as a conventional kinescope, are seen by an observer in red, green and blue light which is of a novel and improved type.

Another object is to provide an arrangement of the type referred to in the preceding paragraph in which the size of the color-filter driving mechanism, the velocity of its motions, and the power driving it are enormously reduced.

Still another object is to provide a novel and improved attachment which may be used with ordinary receivers for black-and-white television pictures to adapt them so that they can receive and present to an observer's eyes color television pictures of the frame-sequential type.

Other objects of my invention will become apparent upon reading the following description taken in connection with the drawings, in which.

Figure 1:
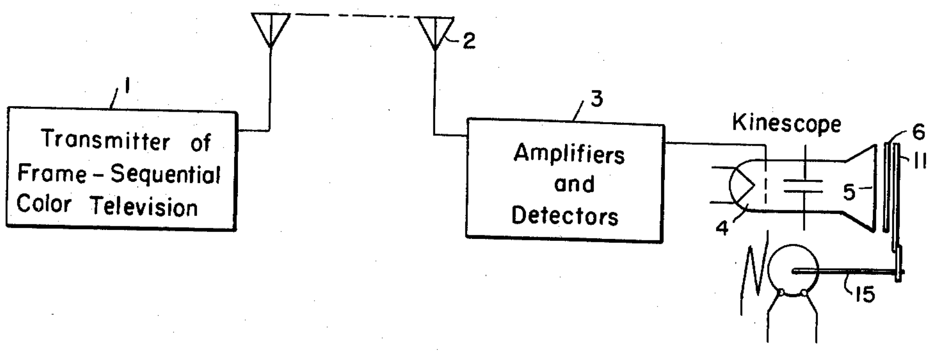
Figure 1 is a diagrammatic showing of a color television system embodying my invention.

Referring in detail to Fig. 1, a transmitter 1 may be of any conventional type for sending out television signals of the type in which every group of three successive frames correspond to the red light, the green light and the blue light in the picture being sent out. Such transmitters and their component parts are well known in the art and so are believed to require no detailed description. These signals are picked up by an antenna 2 and fed through suitable amplifiers and detector circuits 3, also well-known in the art today, to a kinescope 4 having a fluorescent output screen 5 on which a scanning beam produces an illuminated spot which produces a picture in successive frames in replica of those being scanned at the same instant at the transmitter 1. Since such television picture-receivers are well known in the art, and the components 2, 3, 4 and 5 may in fact be those of a conventional black-and-white picture receiver, it is believed sufficient here to point out that the scanning beam in kinescope 4 produces the light-images on its output by generating a luminous spot at the upper left-hand corner of the raster at the beginning of any frame, moving it horizontally in a straight line to the right-hand edge of the picture, then starting a second horizontal path just below the first at the left-hand edge of the picture, moving the luminous spot across it to the right-hand edge, starting a third horizontal path at the left-hand edge, and so on until the foot of the picture is reached. Throughout this movement the intensity of the electron beam and the luminous spot vary from point-to-point in correspondence with the intensity of the light at the same points of the picture at the transmitter. Frame after frame, formed in this way in fluorescent light on the screen 5, follow each other at the rate, in present practice, of 144 per second. I here have illustrated my invention by describing it as applied to picture transmission using three primary colors, but it can of course be applied to transmissions in any number of colors by modifying the apparatus in ways obvious to a man skilled in the art.

The luminosity at any point on the picture-screen 5 appears almost instantly when the moving end of the electron beam strikes it, but persists for a brief interval after the electron-beam has moved on. Except for this persistence, the light-image actually present on the output screen 5 at any instant would be merely a luminous spot, but persistence of vision in the human eye would integrate the impression of all these instantaneous spots on the screen into a picture of the entire frame. As above noted, the screens have actually used fluorescent coatings with a brief light-persistence of their own, and the light-image actually present on the screen 5 at any instant consists not of a mere luminous point, but of the horizontal line then being scanned by the spot together with perhaps one or two preceding lines from which the fluorescent light has not had time to fade out. The thing to be noted for present purposes is that the light actually reaching the observer's eye at any instant comes not from the whole area of screen 5, but from the small area on which the electron beam is then incident and a very limited area which it has just passed over.

Turning again to Fig. 1, the face of screen 1 is covered by a mask 11 and a filter-screen 6. The structure of mask 11 may best be shown by reference to Fig. 3. The structure of filter-screen 6 may best be shown by reference to Fig. 2. As there evident, the screen 6 may comprise a thin sheet of opaque material, e. g. metal, having groups of triads comprising circles of red, green and blue transmitting material distributed in rows over an area of the size and shape of the picture raster on screen 5. Thus there is a top horizontal line of such triads respectively centered about a row of equally spaced center-points 7; a second row of triads centered about a similarly spaced row of center-points 8 also equally spaced along a horizontal line, and so on to the foot of the screen in parallel rows equally spaced apart. Each triad is made up of a red, a green and a blue circular filter symmetrically spaced with their centers at a radial distance $r$ about its center-point 7 or 8, etc., in counterclockwise sequence. In the top row of triads, it will be noted that the line connecting center-point 7 to the center of the green filter-circle is vertical; in the second row this line is rotated 15 degrees clockwise from the vertical; in the third row, that line is 30 degrees clockwise from the vertical, and so on for other rows. In short, the azimuths of the triads in successive rows are each rotated by the same angle relative to those of the preceding row as we go down the screen, and in the lowest row the green filter occupies the same position as the red filter does in the top row.

Referring to Fig. 1, a mask 11 which may consist of an opaque sheet, e. g. of metal, is mounted with its face parallel to picture screen 5. Mask 11 is of a structure indicated in Fig. 3 and has rows of circular openings each preferably of the same size as the circular filters in Fig. 2. The top row of openings 12 have centers spaced at the same radial distance $r$ from a top row of reference-points or dots 13. The centers of the red circular filters are spaced from the center-points 7 in Fig. 2. The second row of openings 12 have their centers at this same radial distance $r$, and in the same azimuth, from a row of dots 14, and so on down the sheet to the bottom row of openings. The dots 13 are spaced so that their positions may be superposed on those of dots 7 in Fig. 2; dots 14 will then have positions superposed on those of dots 8 in Fig. 2, and so on for the other rows on mask and screen.

The distance between successive rows of dots 13, 14, etc., is preferably equal or less than to the distance between scanning-lines on the screen 4, and the drawings have for clarity shown the spacing and other dimensions much exaggerated. The filter-screen 6 is mounted so that it may be moved so that center-points 7 describe circular paths about the dots 13 on mask 11, the radius of these paths being equal to the distance $r$ of the centers of the circular filters from the center-points 7. Such a movement will cause first the red filter, then the green filter, and then the blue filter in each triad on filter-screen 6 to register with the nearest opening in mask 11 in the course of one such circular movement. Such a circular movement of filter screen 6 may be produced by any one of various mechanisms; for example, by providing a pair of synchronously rotating shafts 15 each connected by a pivot 16 to one lower corner of filter screen 6. The distance from the center of each shaft 15 to the center of its pivot 16 on mask 11 should be the radius $r$ of the circular motion of the latter. Cams imparting sinusoidal movements in vertical and horizontal directions and 90 degrees out of phase to filter-screen 6 would be another device for producing this desired circular movement. For the frame periodicity of 144 per second usual in frame-sequential television, the shafts 15 should rotate 48 times per second.

If the position of filter screen 6 in its circular movement is synchronized so that the red filters of the top row of triads in screen 6 registers exactly with the top row of openings in mask 11 at the time the electron beam of kinescope 4 is scanning the top line of screen 5, an observer looking at the outer face of filter screen 6 will receive red light through the top row of openings on mask 11, but substantially no light will come from the second or other rows because the lines on screen 5, which register with them, are not yet luminous, but still dark.

By the time the luminous spot makes the second line of screen 5 luminous, the filter-screen 6 will have been rotated sufficiently by shafts 15 so that the openings in the second row of mask 11 register exactly with the red filters of the second row on filter-screen 6. The observer will consequently then see the second line of the picture on screen 5 in red light, but not the third and lower lines because the screen 5 behind those lines on mask 11 is dark.

At this same time the openings in the first row of mask 11 have moved so they have ceased to cover part of the red filters of that row in screen 6, but do uncover a small area of the blue filters therein. If the fluorescent material on the first line of picture screen 5 had completely lost its luminosity no light would come from the blue filters of row one. However, as previously stated, most kinescope screens ordinarily used have persistence enough so that line one on picture screen 5 remains luminous, and so red light with a tincture of blue will appear to the observer's eyes on the first line of the picture. However, this tincture of blue is negligibly small in most practical cases.

When the electron beam renders the third line of picture screen 5 luminous, the circular movement of filter-screen 6 causes the third row of openings in it to register exactly with the red filters in filter screen 6, and the observer's eyes receive red light from the third row of openings. If the fluorescent material had negligible light-persistence, no light would be transmitted from picture-screen 5 through the first two rows of holes in mask 11 notwithstanding the fact that its first and second rows of openings registered with blue as well as red filters of filter-screen 6. However, the light persistence in ordinary fluorescent screens would, as above noted, probably cause transmission of some blue light through the second row of openings in mask 11; but at the same time, the luminosity of the first line of picture screen 5 would probably have fallen so low that substantially no light would come through the first row of filter screen 6, despite the fact that a considerable area of the blue filters thereon is uncovered by the first row of openings in mask 11.

As the fourth and lower rows of picture-screen 5 are scanned they are successively visualized by the observer in red light, with a possible slight tincture of blue, as above described for the first and second lines; but it will be evident that the uncovering by the rotation of filter-screen 6 of more and more of the blue filters of the top lines will not result in transmission of any more blue light to the observer's eyes until the electron beam returns to render the top line luminous at the beginning of the next frame. The same considerations and statements apply of course to the other lines of the picture as scanning proceeds downward thereon.

By the time that the scanning has passed the lowest line of the picture the circular motion of filter screen 11 has traversed 120 degrees and so the blue filters in the first line are in exact registry with the openings in mask 11. The scanning beam then flies back to start scanning the first line of picture-screen 5 with the light-distribution corresponding to the light in the "blue" frame starting to come in from transmitter 1. The observer thus begins to see the new frame in blue light, as is proper.

The blue frame thus appears to the observer in blue light with a negligible tincture of green, and at its termination the filter-screen 6 has been rotated through 240 degrees to bring the green filters of the top row into exact register with the openings in mask 11. The observer then receives from filter-screen 6 a picture in green light while transmitter 1 is sending out the "green" frame, at the end of which the filter-screen 6 has rotated to its initial position and the system is conditioned to repeat the above-described cycle for succeeding frames.

Figure 2:
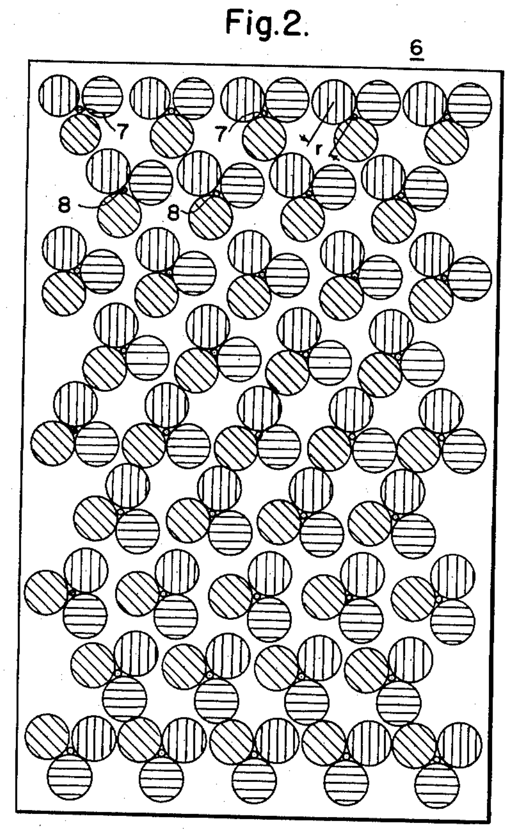
Fig. 2 is a schematic elevation of color filter screen of the type used in my invention.
Figure 3:
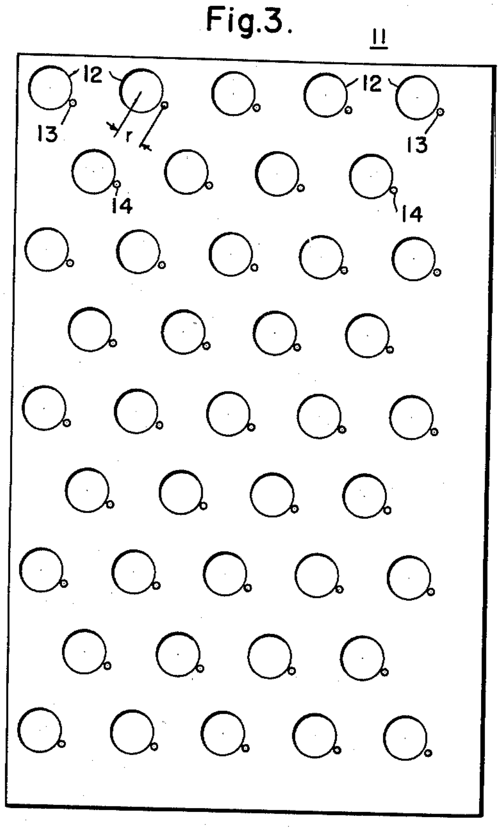
Fig. 3 is a similar view of a mask which cooperates with the filter-screen of Fig. 2.
Figure 4:
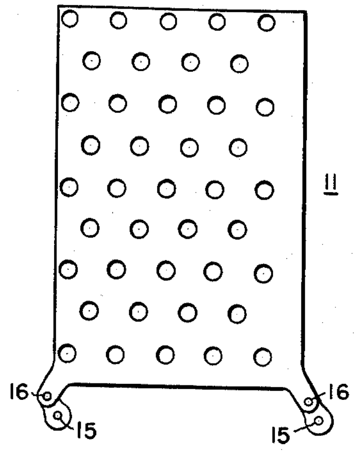
Fig. 4 is a schematic view in elevation of a mechanism for imparting circular movements to the color filter of Fig. 2.

If the phosphor persistence is such that it does not decrease to a negligible value in a few lines, then the holes (transparent areas) in mask Figure 3 can be made smaller than the colored areas of Figure 2. Of course, this will result in some loss in light output.

In practical television, the number of scanning lines between the top and bottom of a picture is 440, hence the angular rotation between successive rows of triads on filter screen 11 is $$\frac{120}{440}$$

degrees instead of the 15 degree rotation shown in Fig. 2 for clearer illustration. Likewise, about 8% of each frame-period is occupied by the fly-back of the scanning beam from the end of one frame to the beginning of the next. Hence the filter screen turns through only $$\frac{100-8}{100}\times 120=110$$

degrees while the screen 5 is actually being scanned, and only enough rows of triads in filter screen 6 are needed so that the triads of the final row are rotated through 110 degrees relative to the triads of the first row.

In view of the small distance between lines in practical television screens, a filter-screen may probably best be made of color-photograph film and mask 11 be made of ordinary black-and-white photograph-film, both with proper support-frames, the opaque parts of the film corresponding with the metal in Figs. 2 and 3.

While I have described the filter-screen 6 as stationary and the mask 11 as being given a rotary movement, the apparatus is suitable for many practical purposes if the mask is stationary and the filter-screen is supported on the pivots 16 to receive a rotary movement.

The filter screen 6 can be vibrated horizontally in a sinusoidal fashion and mask 11 can be vibrated vertically in a sinusoidal motion; that is, 90° out of time phase with the motion of screen 6. These vibratory motions can be obtained with cams or with magnetic solenoids of the type used in loud speakers.

For some purposes, it may be desirable to use twice as many green frames as either red or blue, transmitting red, green, blue, green in succession, and in such a case, quads comprising a red, a green, a blue and a green filter with centers 90 degrees apart around a circle of radius $r$ would replace the triads in screen 11. By making the first pair (red and green) of a medium polarized at 90 degrees to the second pair (blue and green), stereoscopic pictures could be presented in the manner more fully described in my application Serial No. 271,351, filed February 13, 1952, for Stereopticon Television.

Figure 5:
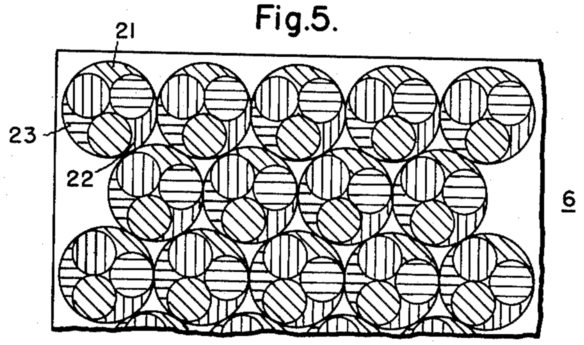
Figs. 5 and 6 are views similar to Fig. 2 of forms of color filter-screen alternative to that shown in Fig. 2.

An alternative form for the filter-screen 6 is shown in Fig. 5. In this arrangement each triad of red, green and blue is inscribed in a larger circle, the lunar areas 21, 22 and 23 of which have a color complementary to that of the two circles which they adjoin, i. e., the green of lune 21 is the complement of the red and blue circles lying adjacent to it. As previously explained, mask 11 is in exact register with one of the filter circles (let us say the red circle) when any line (let us say the top line) is being scanned by the luminous spot on screen 5, and thus the observer will not see any part of the lune area at that time. But when the spot has moved down to scan the second line, the mask 11 will have turned relative to filter-screen 6 so that part of the green lune 23 as well as part of the blue circle will be seen by the observer by the light of the afterglow still present on the fluorescent material of the top line on screen 5. However, the green from lune 23 and blue tincture from the blue filter circle will combine with part of the light from the red filter in the top line to give a small amount of white light. This white tincture will vitiate the red light picture of the top line, which the observer's eye should see by light from the afterglow, less than would the blue tincture described as present in discussing the filter-screen of Fig. 2, hence the Fig. 5 filter-screen is an improvement over the latter.

Figure 6:
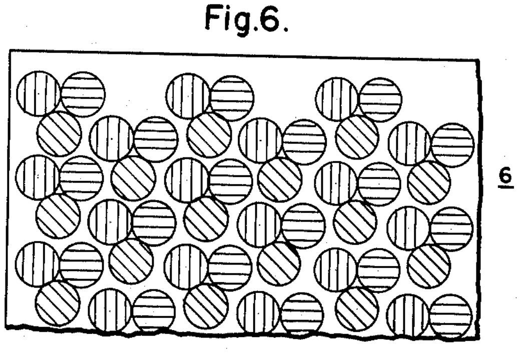

Fig. 6 shows an alternative arrangement of the color circles for filter-screen 6 which makes it possible for color circles of a given diameter to operate with kinescopes having more scanning lines to the inch than is possible with the Fig. 2 filter-screen. By spacing the triads in each row a little further apart than in Fig. 2, the upper pair of filter-circles of the second row of triads intervenes between the lower filter-circles of the first-row triads in the Fig. 6 filter-screen. The triads in successive rows are rotated clockwise relative to the preceding row by the same angle. With a 400 or 500 row of track, each successive row will be rotated about ¼ degree.

I claim as my invention:

1. A color television adapter comprising a mask having on its face a plurality of openings respectively having their centers spaced by a distance $r$ from a corresponding number of reference-points which are equally spaced apart in parallel rows, the azimuths of said centers relative to the direction of said rows being the same, a filter screen having groups of filters of different colors symmetrically spaced at a radius $r$ about center-points which are positioned in rows with the same spacings as said reference-points, the azimuths of the groups in any row differing by a constant angle from the azimuths in the preceding row, and means to produce relative motion between said filter screen and said mask while superposed such that said center-points describe circles of radius $r$ about said reference-points.

2. A color television adapter comprising a mask having on its face a plurality of circular openings respectively having their centers spaced by a distance $r$ from a corresponding number of reference-points which are equally spaced apart in parallel rows, the azimuths of said centers relative to their reference-points in each row being the same as the azimuths of the preceding row, a filter screen having groups of circular filters of primary colors symmetrically spaced at a radius $r$ about center-points which are positioned in rows with the same spacings as said reference-points, the azimuths of said groups relative to said rows differing by a constant angle from those of the preceding row, the lunes between each pair of filters being of the same color as the other filter, and means to produce relative motion between said filter screen and said mask while superposed such that said center-points describe circles of radius $r$ about said reference-points.

3. A color television adapter comprising a mask having on its face a plurality of openings having their centers spaced by a distance $r$ from a corresponding number of reference-points which are equally spaced apart in parallel rows, a filter screen having groups of filters of primary colors symmetrically spaced at a radius $r$ about center-points which are positioned in rows with the same spacings as said reference-points, the azimuths in one row being different by a constant angle from the azimuths in the preceding row for said groups, and means to produce relative motion between said filter screen and said mask while superposed such that said center-points describe circles of radius $r$ about said reference-points.

4. In combination with a color television system of the frame sequential type having a picture receiving screen, a mask having on its face a plurality of openings having their centers spaced by a distance $r$ from a corresponding number of reference-points which are equally spaced apart in parallel rows, a filter screen having groups of filters of different colors symmetrically spaced at a radius $r$ about center-points which are positioned in rows with the same spacings as said reference-points, the azimuths in one row being different by a constant angle from the azimuths in the preceding row for said groups, and means to produce relative motion between said filter screen and said mask while superposed such that said center-points describe circles of radius $r$ about said reference-points.

5. In combination with a color television system of the frame sequential type having a picture receiving screen, a mask having on its face a plurality of openings having their centers spaced by a distance $r$ from a corresponding number of reference-points which are equally spaced apart in parallel rows, the distances separating said rows being equal to the distance between scanning lines on said picture-receiving screen, a filter screen having groups of filters of primary colors symmetrically spaced at a radius $r$ about center-points which are positioned in rows with the same spacings as said reference-points, the azimuths in one row being different by a constant angle from the azimuths in the preceding row for said groups, and means to produce relative motion between said filter screen and said mask while superposed such that said center-points describe circles of radius $r$ about said reference-points.

6. In combination with a color television system of the frame sequential type having a picture receiving screen, a mask having on its face a plurality of openings having their centers spaced by a distance $r$ from a corresponding number of reference-points which are equally spaced apart in parallel rows, the distances separating said rows being equal to the distance between scanning lines on said picture-receiving screen, a filter screen having groups of filters of different colors symmetrically spaced at a radius $r$ about center-points which are positioned in rows with the same spacings as said reference-points, the azimuths in one row being different by a constant angle from the azimuths in the preceding row for said groups, and means to produce relative motion between said filter screen and said mask while superposed such that said center-points describe circles of radius $r$ about said reference-points, the frequency of said circular motions being equal to the frequency with which frames of the same color are transmitted in said color television system.

7. In combination with a color television system of the frame sequential type having a picture receiving screen, a mask having on its face a plurality of openings having their centers spaced by a distance $r$ from a corresponding number of reference-points which are equally spaced apart in parallel rows, a filter screen having groups of filters of primary colors symmetrically spaced at a radius $r$ about center-points which are positioned in rows with the same spacings as said reference-points, the azimuths in one row being different by a constant angle from the azimuths in the preceding row for said groups, and means to produce relative motion between said filter screen and said mask while superposed such that said center-points describe circles of radius $r$ about said reference-points, the frequency of said circular motions being equal to the frequency with which frames of the same color are transmitted in said color television system.

8. In combination with a color television system of the frame sequential type having a picture-receiving screen, a mask having on its face a plurality of circular openings having their centers spaced by a distance $r$ from a corresponding number of reference-points which are equally spaced apart in parallel rows, said centers having the same azimuth relative to said reference-points, a filter screen having groups of circular filters of primary colors symmetrically spaced at a radius $r$ about center-points which are positioned in rows with the same spacings as said reference-points, the azimuths of the groups in any one row differing by a constant angle from the azimuths of groups in the preceding row, the lunes between each pair of filters being of the same color as the other filter, and means to produce relative motion between said filter screen and said mask while superposed such that said centers describe circles of radius $r$ about said reference-points.

9. In combination with a color television system of the frame sequential type having a picture-receiving screen, a mask having on its face a plurality of openings having their centers spaced by a distance $r$ from a corresponding number of reference-points which are equally spaced apart in parallel rows, the distances separating said rows being equal to the distances between scanning lines on said picture receiving screen, said centers having the same azimuth relative to said reference-points, a filter screen having groups of filters of different colors symmetrically spaced at a radius $r$ about center-points which are positioned in rows with the same spacings as said reference-points, the azimuths of the groups in any one row differing by a constant angle from the azimuths of groups in the preceding row, and means to produce relative motion between said filter screen and said mask while superposed such that said centers describe circle of radius $r$ about said reference-points.

10. In combination with a color television system of the frame sequential type having a picture-receiving screen, a mask having on its face a plurality of openings having their centers spaced by a distance $r$ from a corresponding number of reference-points which are equally spaced apart in parallel rows, the distances separating said rows being equal to the distance between scanning lines on said picture receiving screen, said centers having the same azimuth relative to said reference-points, a filter screen having groups of filters of primary colors symmetrically spaced at a radius $r$ about center-points which are positioned in rows with the same spacings as said reference-points, the azimuths of the groups in any one row differing by a constant angle from the azimuths of groups in the preceding row, and means to produce relative motion between said filter screen and said mask while superposed such that said centers describe circles of radius $r$ about said reference-points, the frequency of said circular motions being equal to the frequency with which frames of the same color are transmitted in said color television system.

11. In combination with a color television system of the frame sequential type having a picture-receiving screen, a mask having on its face a plurality of openings having their centers spaced by a distance $r$ from a corresponding number of reference-points which are equally spaced apart in parallel rows, said centers having the same azimuth relative to said reference-points, a filter screen having groups of filters of different colors symmetrically spaced at a radius $r$ about center-points which are positioned in rows with the same spacings as said reference-points, the azimuths of the groups in any one row differing by a constant angle from the azimuths of groups in the preceding row, and means to produce relative motion between said filter screen and said mask while superposed such that said centers describe circles of radius $r$ about said reference-points, the frequency of said circular motions being equal to the frequency with which frames of the same color are transmitted in said color television system.

12. An adapter for a color television system of the frame sequential type having a picture receiving screen, a mask having on its face a plurality of openings having their centers spaced by a distance $r$ from a corresponding number of reference-points which are equally spaced apart in parallel rows, a filter screen having groups of filters of different colors symmetrically spaced at a radius $r$ about center- points which are positioned in rows with the same spacings as said reference-points, the azimuths in one row being different by a constant angle from the azimuths in the preceding row for said groups, and means to produce relative motion between said filter screen and said mask while superposed such that said center-points describe circles of radius $r$ about said reference-points.

13. An adapter for a color television system of the frame sequential type having a picture receiving screen, a mask having on its face a plurality of openings having their centers spaced by a distance $r$ from a corresponding number of reference-points which are equally spaced apart in parallel rows, the distances separating said rows being equal to the distance between scanning lines on said picture-receiving screen, a filter screen having groups of filters of primary colors symmetrically spaced at a radius $r$ about center-points which are positioned in rows with the same spacings as said reference-points, the azimuths in one row being different by a constant angle from the azimuths in the preceding row for said groups, and means to produce relative motion between said filter screen and said mask while superposed such that said center-points describe circles of radius $r$ about said reference-points.

14. An adapter for a color television system of the frame sequential type having a picture-receiving screen, a mask having on its face a plurality of circular openings having their centers spaced by a distance $r$ from a corresponding number of reference-points which are equally spaced apart in parallel rows, the distances separating said rows being equal to the distance between scanning lines on said picture receiving screen, said centers having the same azimuth relative to said reference-points, a filter screen having groups of circular filters of different colors symmetrically spaced at a radius $r$ about center-points which are positioned in rows with the same spacings as said reference-points, the azimuths of the groups in any one row differing by a constant angle from the azimuths of groups in the preceding row, the lunes between each pair of filters being of the same color as the other filter, and means to produce relative motion between said filter screen and said mask while superposed such that said centers describe circles of radius $r$ about said reference-points, the frequency of said circular motions being equal to the frequency with which frames of the same color are transmitted in said color television system.

References Cited in the file of this patent

UNITED STATES PATENTS

| | | |
|---|---|---|
| 2,452,293 | De Forest | Oct. 26, 1948 |
| 2,538,071 | Young | Jan. 16, 1951 |
| 2,617,875 | De Forest | Nov. 11, 1952 |

FOREIGN PATENTS

| | | |
|---|---|---|
| 589,345 | Great Britain | June 18, 1947 |